3,398,105
EXPANDABLE POLY(VINYLAROMATIC) COMPOSITIONS AND PROCESS OF MAKING SAME
Alec N. Roper, Cheshire, and Edward G. Barber, Manchester, England, assignors to Shell Oil Company, New York, N.Y., a corporation of Delaware
No Drawing. Filed Sept. 13, 1965, Ser. No. 487,029
Claims priority, application Great Britain, Sept. 21, 1964, 38,362/64
10 Claims. (Cl. 260—2.5)

ABSTRACT OF THE DISCLOSURE

Expandable polystyrene compositions, cellular polymeric materials prepared therefrom and the process of preparing the expandable compositions and cellular materials wherein there is incorporated in polystyrene from 0.01 to 0.5% of a finely divided resinous polymer and a volatile expanding agent which comprises a mixture of n-pentane and isopentane containing at least 30 but less than 80% by weight of isopentane.

---

This invention relates to expandable poly(vinylaromatic) compositions, to cellular polymeric material prepared therefrom, and to the processes of preparing said expandable compositions and cellular materials.

Specifically, the invention provides improved expandable poly(vinylaromatic) compositions wherein the "cooling time requirement" for the subsequent molding thereof is substantially reduced.

The term "expandable" is used herein to refer to poly(vinylaromatic) compositions which, by virtue of a vaporizable expanding agent incorporated therein, are capable of being expanded to an appreciable extent, i.e., to at least 10 times the original volume. The term "pre-expanded" is used herein to refer to a product obtained by expanding an expandable poly(vinylaromatic) composition. Such pre-expanded products are still capable of further expansion, but only to a limited extent, such as occurs when a mass of pre-expanded particles is heated in an enclosed mold. A fully expanded poly(vinylaromatic) composition, such as is obtained by heating a mass of pre-expanded particles, is referred to herein as "cellular polymeric material."

Cellular polymeric material may be prepared in many ways. The present invention is concerned with methods wherein cellular materials are formed from expandable poly(vinylaromatic) compositions which comprise (1) a poly(vinylaromatic) compound, such as polystyrene, (2) an expanding agent incorporated therein in particulate form, and (3) an organic resinous polymeric substance intimately distributed in the composition. The term "resinous" has its usual meaning in the art and refers to a polymeric substance which is not an elastomer. The resulting expandable particles can subsequently be expanded to, for example, 30 to 40 times their original volume by heat treatment which volatilizes the expanding agent. A mass of such expanded particles can be fused together in a closed mold to form polymeric material of cellular structure, a minor amount of further expansion taking place during such molding. The word "particle" as used in this context includes beads, pearls, nibs, granules, powder and other sub-divided forms of the poly(vinylaromatic) composition. If desired, all the expansion and fusion to a shaped article can be effected in one stage by heating a mass of expanded particles, but for technical reasons it is often preferable to effect pre-expansion in a separate stage. Accordingly, pre-expanded expandable particles in an enclosed mold are heated under conditions such that they fuse together to form a cellular structure. For example, employing the well-known so-called steam molding technique, heating is conveniently effected by means of steam, a wall or walls of the mold being perforated to allow penetration of the steam into the mass of particles. After the injection of the steam, a period of time must elapse before the mold can be opened without collapse of the molding, i.e., cellular structure. This period of time is referred to in the art as the "cooling requirement." In practice it is desirable to ensure that the performance of the expandable particles with respect to cooling time is as consistent as possible from batch to batch so that the molder can employ a standard cooling time for any given expandable material and mold. Moreover, from an economical standpoint the "cooling time requirement" should obviously be as low as possible in order to reduce the overall time requirement for molding each shaped article. The "cooling time requirement" involved in forming cellular polymeric material from the above-described expandable poly(vinylaromatic) compositions according to prior art techniques is at least 25 minutes and in most instances at least 40 minutes.

It is therefore an object of the present invention to provide expandable poly(vinylaromatic) compositions wherein the "cooling time requirement" for the subsequent molding thereof is substantially reduced. It is a further object to provide a method of preparing said expandable compositions and to provide a method of forming cellular polymeric materials therefrom. Other objects and advantages of the invention will be apparent from the following detailed description thereof.

It has now been discovered that these and other objects may be accomplished by the improved expandable poly(vinylaromatic) compositions of the invention which comprise (1) a poly(vinylaromatic) compound, (2) an organic resinous polymeric substance intimately distributed in the composition, and (3) a particular vaporizable expanding agent consisting of a mixture of n-pentane and iso-pentane, said mixture containing more than 30% but less than 80%, and preferably less than 70%, by weight of iso-pentane, the agent being intimately distributed in the poly(vinylaromatic) compound.

In our copending U.S. application Ser. No. 248,882, now Patent 3,224,984, we disclosed expandable poly(vinylaromatic) compositions. The present invention is a modification or those compositions which results in an improved process of preparing cellular material therefrom, whereby the "cooling time requirement" is substantially reduced. This improvement results from using the expanding agents described immediately above in place of those disclosed in said copending application or the prior art. Accordingly, the expandable poly(vinylaromatic) compositions, pre-expanded compositions, and cellular material of the present invention are prepared in the same manner as described in said copending application. Moreover, since the constituents of the expandable poly-vinylaromatic) compositions of the present invention differ from those of our said copending case only in the expanding agent incorporated therein, the poly(vinylaromatic) compounds and organic resinous polymeric substances disclosed in said copending application are suitably the preferred constituents of the expandable compositions of the present invention. Therefore, reference is made to our said copending application for a detailed description of preparing the expandable poly(vinylaromatic) composition and cellular material therefrom, as well as for a disclosure of suitable poly(vinylaromatic) compounds and organic resinous polymeric substances which comprise the expandable compositions of the present invention.

In general, the compositions are prepared from styrene by any suitable suspension-, emulsion- or bulk-polymerization techniques thereof, and preferably by aqueous suspension polymerization techniques, usually by the aid of a catalyst, from styrene containing the required polymeric substance in suspension. The expanding agent may be incorporated after or in conjunction with polymerization of the styrene. The expanding agent can be incorporated either in a separate operation, e.g., by supplying said expanding agent to an aqueous suspension of the polystyrene composition in particulate form at temperatures below, at, or above the softening temperature thereof, or alternatively in conjunction with suspension polyerization by supplying said agent to the polymerization vessel at a suitable stage in the polymerization at which polymerziation has already proceeded to an extent such that discrete masses comprising polystyrene as present in suspension in the aqueous polymerization medium. It has been found from microphotographic data obtained under polarized light that the polymeric substance is present in the expandable compositions as a separate non-continuous phase comprising a very large number of discrete masses distributed therein.

Expansion is preferably effected by steam treatment at temperatures between 90° and 120° C. as described hereinbefore. It is possible to produce cellular material in accordance with the present invention which is a low bulk density cellular polystyrene having an average cell size, considered as the diameter of a spherical cell, below 95 microns, e.g., 80 microns.

While the present invention is particularly applicable to polystyrene and will be described hereinafter with reference thereto for ease of description, it is to be understood that the invention is also applicable to other poly(vinylaromatic) compounds.

The expandable poly(vinylaromatic) compositions of the prior art, including those described in said copending application, have incorporated therein vaporizable expanding agents which are commercially available, such as n-pentane. Commercially available n-pentane contains a proportion of isopentane since complete separation of these pentane isomers in the distillation processes from which n-pentane is obtained is not feasible commercially. The commercial grade contains about 0.5% and the technical grade about 8% by weight of isopentane. Similarly, the iso-pentane of commerce may contain up to a maximum of about 9% by weight of n-pentane.

Surprisingly, it has now been found that when certain mixtures of n-pentane and iso-pentane, which are not the commercially available mixtures referred to above, are employed as the vaporizable expanding agent in an expandable particulate poly(vinylaromatic) compound which contains between 0.01 and 1.0% by weight of an organic resinous polymeric substance having a molecular weight of the order of 1000 to 4000, significant reductions are obtained in the "cooling time requirement" for the subsequent molding of the expandable particulate poly(vinylaromatic) composition into shaped articles.

The present invention therefore requires not only the use of particular expanding agents, but further requires that the agents are incorporated into a poly(vinylaromatic) compound which contains a small but critical amount of a particular organic resinous polymeric substance. Suitable organic resinous polymeric substances include, specifically, divinyl benzene/styrene copolymers (made by emulsion polymerization), Ziegler polyethylene (density 0.945), Ziegler polypropylene. The preferred polymeric substances are resinous polyolefins having a weight average molecular weight of the order of 1,000 to 4,000, more preferably 1,000 to 3,000 and most preferably 1,500 to 2,500. Good results are obtained with high-density polyethylene having a density of from 0.94 to 0.965 and having a molecular weight of the order of 1,500 and 2,500 and are obtained by Ziegler low-pressure processes.

It has been found that for the polystyrene compositions of the present invention which contain a minor amount of an organic resinous polymeric substance a non-linear relationship exists between the "cooling time requirement" and the iso-pentane content of the pentane vaporizing agent of the compositions. In accordance with this relationship it has been established that if the iso-pentane content of the pentane vaporizing agent is at least 30% by weight, the cooling time is both significantly lower and tends to be less variable from batch to batch. However, it has also been found that if the iso-pentane content of the agent is above 80% by weight, the advantage gained by reduction of the "cooling time requirement" is reduced by virtue of the longer treatment time required to ensure complete penetration of the iso-pentane mixture into the polystyrene during the incorporation of the expanding agent, which preferably takes place during manufacture of the polystyrene. If penetration is incomplete, a portion of the polystyrene remains unexpanded in the resulting cellular material. When the latter is produced from pre-expanded particles, the pre-expanded particles formed from expandable particles in which penetration of the expanding agent is incomplete contain a core of unexpanded polystyrene. This defect arising from incomplete penetration of the expanding agent has become known in the art as "hardcore." Although hardcore may be avoided when using mixtures rich in iso-pentane or isopentane itself by increasing the treatment time, this has been found to be uneconomical for mixtures of isopentane and n-pentane containing more than 80% by weight of isopentane. It is in fact surprising that although hardcore, indicative of a slower rate of penetration into the polystyrene, is obtained when using n-pentane/isopentane mixtures containing more than 80% isopentane under treatment conditions in which technical n-pentane gives no hardcore problem, an improvement in regard to "cooling time requirement" can be obtained when using mixtures of isopentane and n-pentane, provided of course such mixtures contain at least 30% by weight of isopentane.

In carrying out the present invention the poly(vinylaromatic) compound preferably contains between about 0.05 and 0.5%, e.g., of the order of 0.1% by weight, of a resinous polyolefin and good results have been obtained using polyethylene having a molecular weight of 2,000. The preferred pentane mixtures are those containing between 60 and 40% of n-pentane and between 40 and 60% of iso-pentane, respectively, with not more than 5% of non-pentanes, e.g., $C_4$ hydrocarbons, percentages being by weight. The total pentane content of the expandable compositions range from about 3 to 9%, and generally 5 to 7%, by weight, as determined by the total volatiles method.

To illustrate the manner in which the invention may be carried out, the following examples are given. It is understood that the examples are for purposes of illustration and the invention is not to be regarded as limited to any specific compounds or conditions recited therein.

EXAMPLE 1

This example illustrates the surprising effect of using n-pentane/isopentane mixtures containing at least 30% by weight of isopentane. Expandable polystyrene beads are manufactured by aqueous suspension polymerization of styrene containing 0.1% by weight of a hard polyethylene having an average molecular weight of 2,000 and a density of 0.92, 7.5% by weight of a pentane fraction is added as expanding agent during polymerization. The composition of the expanding agent used in making eleven batches of these beads is 18% isopentane, 80% n-pentane and 2% C₄ hydrocarbons, percentages being by weight. A further ten batches of beads are made in the same way using as expanding agent a pentane fraction containing 91.5% isopentane, 5.4% n-pentane and 3.1% C₄ hydrocarbons, the percentages also being by weight. Polymerization is effected in conventional manner using an aqueous medium comprising a bentonite/gelatin suspension stabilizer and containing potassium chloride. The expanding agent is fed into the reactor at the stage in polymerization in which the low molecular weight polystyrene globules of the suspension has become sufficiently dense so that they tend to sink in the aqueous phase. Actual sinkage is prevented by adequate stirring. The polymerization cycle typically comprises a heat-up period to about 90° C. followed by polymerization to the stage referred to, after which the expanding agent is fed in under pressure. Polymerization is then continued under gradually increasing temperature to a maximum of about 120° C. until polymerization is complete. The reactor is then vented to atmosphere and the reaction mixture is cooled down and removed for isolation of the expandable bead product.

Beads from each of these batches are then molded in the following manner. The beads are pre-expanded by direct contact with steam in a continuous pre-expander in accordance with conventional practice. The pre-expanded beads are then allowed to stand for 24 hours in air to mature. After maturing, each batch of beads is molded in a 3 foot x 2 foot x 1 foot mold fitted with perforated side walls and steam chests in communication therewith. The mold is filled with beads, then closed and steam is passed into the mold until a pressure of 15 pounds per square inch (gauge) is reached. The steam supply is then shut off and the steam chests are vented to atmosphere. The mold is fitted with a transducer which records on a chart the pressure exerted by the block on the mold walls. When this recorded pressure has fallen to pounds per square inch (gauge) it is possible to remove the block from the mold. The time taken to reach this pressure after venting the steam chests to atmosphere is taken as the "cooling time requirement" for the block.

The first series of pre-expanded beads made from expandable beads containing the pentane fraction rich in n-pentane has an average cooling time of 14.5 minutes and the spread of results is such that the 95% confidence limits are ±5 minutes. The second series of pre-expanded beads made from expandable beads containing the pentane fraction rich in isopentane has an average cooling time of 8 minutes, with 95% confidence limits of ±2 minutes. These results show clearly the advantages from the point of view of "cooling time requirement" of using, as an expanding agent, a pentane fraction rich in iso-pentane. It is found, however, that when using a pentane fraction containing as much as 91.5% by weight of iso-pentane, the time taken for incorporating the pentane in the polystyrene globules during manufacture in the manner described above is significantly longer, if hardcore is avoided, than when using the pentane fraction rich in n-pentane.

By way of comparison expanded beads are made in the manner described from styrene monomer without the resinous polyethylene and it is found that the "cooling time requirement" of the resulting pre-expanded beads is over 40 minutes irrespective of the nature of the pentane fraction used as the expanding agent. The surprising effect of using a pentane mixture rich in iso-pentane therefore depends on the presence in the polystyrene of the organic resinous polymeric material.

EXAMPLE 2

Batches of pre-expanded polystyrene beads are made and tested in the manner described in Example 1, using as the expanding agent various mixtures of n-pentane and iso-pentane as tabulated below:

| Expanding Agent Composition | | Total Pentane Content Percent wt. | Mean Cooling Time (minutes) |
|---|---|---|---|
| Percent wt. n-pentane | Percent wt. iso-pentane | | |
| 88.1 | 11.5 | 6.40 | 19 |
| 80.0 | 18.0 | 6.23 | 14.5 |
| 74.4 | 24.8 | 5.98 | 15 |
| 66.2 | 30.1 | 6.11 | 10.5 |
| 54.7 | 39.3 | 6.12 | 7.25 |
| 45.0 | 52.8 | 6.48 | 8 |
| 6.2 | 90.1 | 6.18 | 8 |

For each expanding agent used a number of batches of expandable beads are made and tested in order to determine the mean cooling time for the expanding agent. It will be seen from the tabulated results that there is a non-linear relationship between the cooling time requirement and the iso-pentane content of the expanding agent, and that when more than 30% by weight of iso-pentane is present the cooling time requirement is not only significantly lower but is less variable.

We claim as our invention:

1. A method for producing expanded polystyrene having an average cell diameter below 95 microns which comprises heating to a temperature between 90° and 120° C., a polystyrene containing evenly distributed therein (1) from 0.01 to 0.5 percent by weight of a finely divided organic resinous polymer selected from divinyl benzene/styrene copolymers and polyolefins which is substantially immiscible with said polystyrene at said temperature and has a weight average molecular weight between 1,000 and 4,000 and (2) a volatile expanding agent which comprises an n-pentane and isopentane mixture containing at least 30% but less than 80% by weight of isopentane.

2. A method according to claim 1 wherein said expanding agent consists of between 60 and 40 percent of n-pentane, between 40 and 60 percent of isopentane, and not more than 5 percent of non-pentane, the percentages being by weight.

3. A method according to claim 1 wherein said resinous polymer is polyethylene having a molecular weight between 1,500 and 2,500.

4. A method according to claim 1 in which said expanded polystyrene is in the form of partially expanded beads, capable of some further expansion.

5. A method of producing molded polystyrene articles which comprises combining beads defined in claim 4 in a closed mold, heating the contents of the mold and maintaining an elevated temperature until expansion and fusion are complete, cooling the contents of the mold until the internal pressure thereof is substantially atmospheric, and discharging the molded article.

6. A process for making an expandable polystyrene composition which comprises polymerizing styrene having uniformly dispersed therein 0.01 to 0.5 percent by weight of a resinous polyethylene having a weight average molecular weight between 1,000 and 4,000, and impregnating the resulting polystyrene with a volatilizing expanding agent which comprises an n-pentane and isopentane mixture containing at least 30 percent but not more than 80 percent by weight of isopentane.

7. The process according to claim 6 in which said polymerization takes place in aqueous suspension and results in the production of expandable beads.

8. An expandable polystyrene composition comprising a polystyrene containing evenly distributed therein (1) from 0.01 to 0.5 percent by weight of a finely divided organic resinous polymer selected from divinyl benzene/styrene copolymers and polyolefins which is substantially immiscible with said polystyrene and has a weight average molecular weight between 1,000 and 4,000 and (2) a volatile expanding agent which comprises an n-pentane and isopentane mixture containing at least 30% but less than 80% by weight of isopentane.

9. The composition as defined in claim 8 in which said resinous polymer is polyethylene having a molecular weight of from 1,500 to 2,500.

10. A composition according to claim 8 wherein said expanding agent consists of between 60 and 40 percent of n-pentane, between 40 and 60 percent of isopentane, and not more than 5 percent of non-pentanes, the percentages being by weight.

References Cited

UNITED STATES PATENTS

| | | | |
|---|---|---|---|
| 3,224,984 | 12/1965 | Roper et al. | 260—2.5 |
| 3,320,188 | 5/1967 | Dijkema | 260—2.5 |

MURRAY TILLMAN, *Primary Examiner.*

M. FOELAK, *Assistant Examiner.*